TELEVISION REPAIR DEVICE

Filed Nov. 30, 1967

INVENTOR.
JAMES B. LINDSAY
BY
Norman N. Holland
ATTORNEY

United States Patent Office 3,508,746
Patented Apr. 28, 1970

3,508,746
TELEVISION REPAIR DEVICE
James B. Lindsay, 18 Bodwell Terrace, Millburn, N.J. 07041
Filed Nov. 30, 1967, Ser. No. 687,023
Int. Cl. B62b *1/26;* B23q *3/10*
U.S. Cl. 269—17 1 Claim

ABSTRACT OF THE DISCLOSURE

A television repair device or support for facilitating the in-place repair of typical television sets or similar console cabinets including electronic or electro-mechanical elements. The device has spaced support arms for engaging the cabinet bottom and handle means for turning or rotating the cabinet for exposing the heat opening in the set bottom and therefore the underside of the interior television circuit chassis or the other internal elements.

BACKGROUND OF THE INVENTION

The present invention relates to a device for facilitating the in-place repair of television or similar sets by providing a means for tilting the set to expose the interior electronic components. The invention relates more particularly to a tilting support device by means of which one person may tilt the television set to expose its bottom for permitting access to the interior through the regular heat opening provided in such sets.

The repair of large cabinet or console types of television sets or other electronic sets and particularly of color television sets presents a problem due to the inaccessibility of the set components when the set is in its normal standing position. The present solution to this problem usually consists in the removal of the set to a suitably equipped repair station. This operation requires the use of more than one repair man together with a transport means for assuring a safe movement of the set.

This problem is particularly acute in connection with color television sets as their relatively complex circuits and the sensitive nature of the circuits requires them to be firmly or rigidly mounted with many of the critical electronic components mounted on the underside of a metal chassis. These components are not accessible through the rear of the set and in present repair procedures this has required removal or a partial disassembly of the set. Such removal is not only relatively expensive but it also is undesirable in color sets as it requires a return of the set after repair during which the set is subjected to the inevitable hazards of delivery. Additionally, the returning of the set to the user and the handling of the set during the return often require final readjusting of the set after the set has been returned to its regular viewing position. During such final readjustment, the difficulty of access to critical areas in the set may again be encountered.

The device of the present invention provides a portable tilting means which is operated by one person and which easily rotates all styles of present television and similar sets onto their side thereby making the interior of the sets accessible through the normal heat opening at the bottom of the sets. Most repairs may be made after tilting without removing the set from the viewing location and after the repair has been made, the set is easily and safely turned back to its regular standing position.

Accordingly, an object of the present invention is to provide an improved device for repairing television and similar relatively heavy electronic devices including amplifiers, phonographs, and the like.

Another object of the present invention is to provide an improved rotating device for television consoles and similar appliances which is easily operated by one person and which is portable.

Another object of the present invention is to provide a device for making the interiors of relatively heavy electronic or electro-mechanical cabinets accessible through their bottoms by performing a simple tilting operation.

Other and further objects of the present invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figure 2:
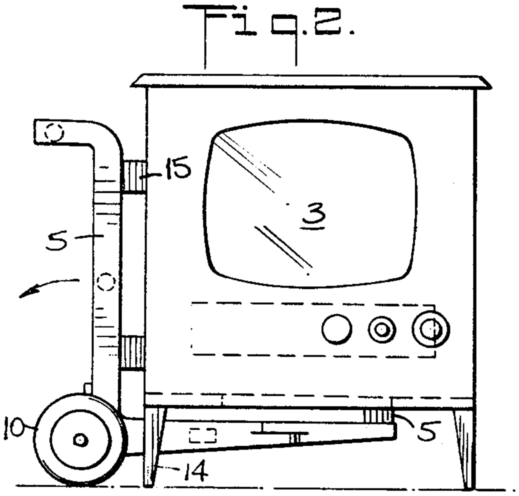
FIGS. 2 and 3 are front elevational views illustrating the operation of the device in positioning a typical television console for repair.

A preferred embodiment of the device 1 is illustrated in the drawings. It comprises a pair of support arms 2 for engaging the underside of a typical appliance such as a television console 3. The top view in FIG. 4 shows in dash-dot lines a typical television set or console 3 and the outline of the typical heat opening necessarily provided in the bottom of such electronic equipment is shown in outline at 4. The operating and end support handles 5 extend upwardly from the arms 2 which operate through the intermediation of a convenient cross handle member 6 to turn the set 3 from the position of FIG. 2 to the position of FIG. 3 for repair.

It is preferable that the support arms 2 have an adjustable spacing to adapt them for use with differing set configurations, and a preferred embodiment of this adjustment is illustrated in the pivoted end portions 7 adjustably attached to the arms 2 by bolts 8. In order to provide for heat dissipation, the bottoms of conventional television and other electronic sets are spaced varying distances from the floor and include the relatively large heat opening 4 to permit cooling air to pass into the set due to natural convection. It is also desirable that the position of the arms 2 when inserted beneath the set 3 have an adjustable height which permits them to be moved beneath the bottoms of varying heights from the floor.

A preferred means for adjusting the height of the support arms 2 is illustrated in FIG. 1 wherein the axle 9 for the tilting wheels 10 has its height adjustably set by the intermediation of adjustable brackets 11. Suitable slots 12 and cooperating wing-nuts 13 for adjustably clamping the brackets 11 to the vertical handles 5 permit the height adjustment through raising and lowering the brackets 11 on the vertical handles 5. The support wheels 10 are provided to facilitate the tilting action and also for movement of the set 3 where necessary to a convenient repair point.

Figure 3:
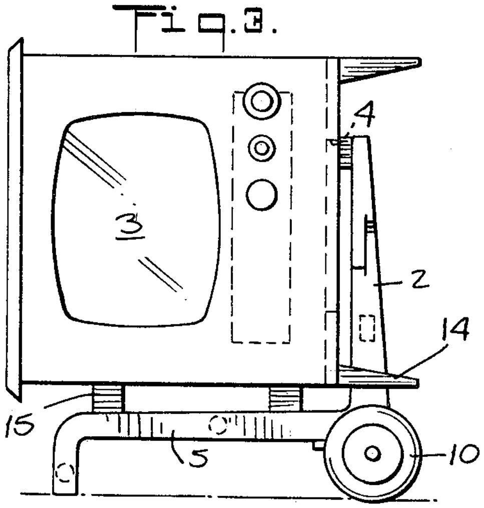
Figures 1, 4:
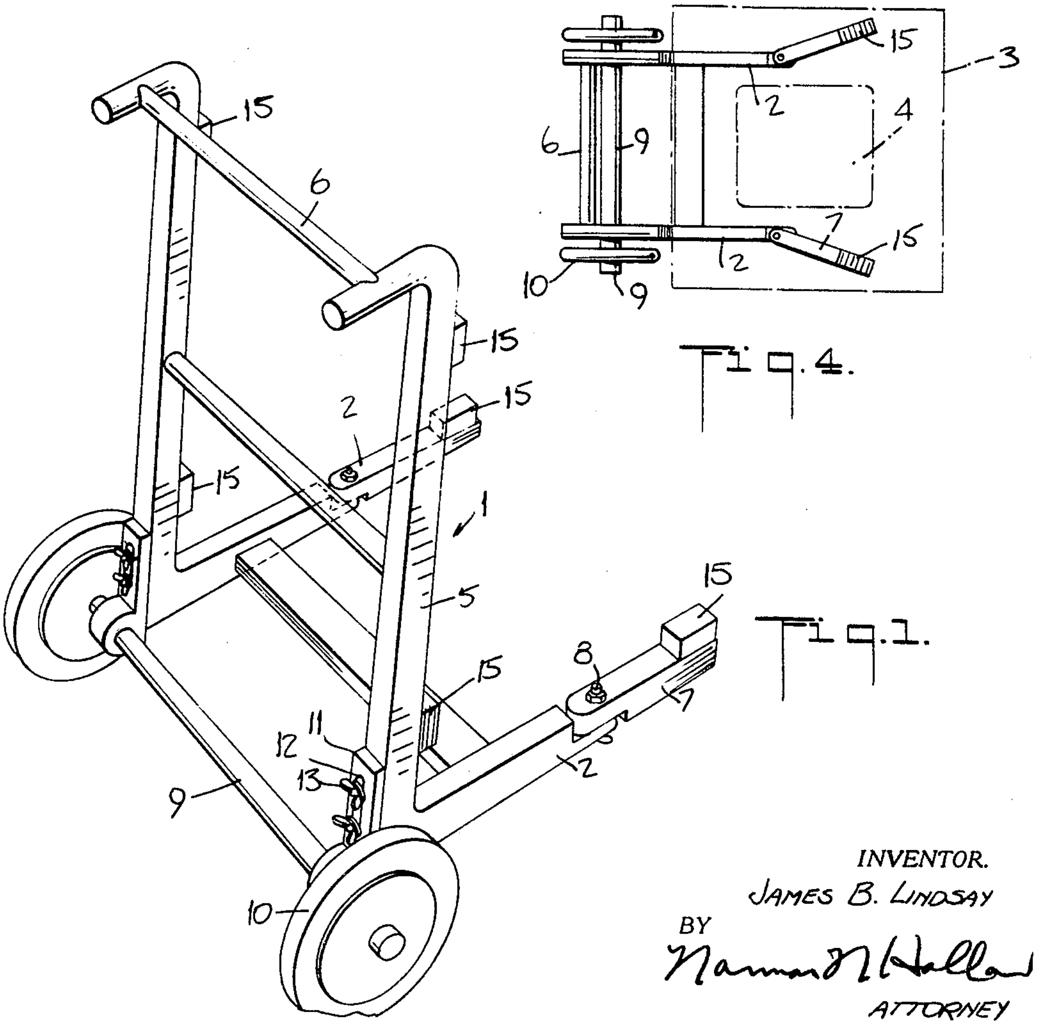
FIG. 1 is a perspective view of the preferred embodiment of the present invention.
FIG. 4 is a top plan view of the device of the invention.

In order to assure the lifting of the set support members nearest to the wheels 10, such as the legs 14 illustrated in FIGS. 2 and 3, the axis of the axle 9 is positioned rearwardly of the handles 5. It is seen that this positioning of the axis results in an immediate lifting of all legs including the closer legs 14 as soon as the device 1 is tilted in the direction of the arrows in FIG. 2. Support pads 15 for the set 3 are provided on both the arms 2 and the vertical handles 5 and preferably are formed of a relatively soft cushion material such as soft rubber or plastic to both help retain the set in position and to cushion its movement during the tilting action.

If desired, a brake means may be applied to one or both wheels so that the wheels may be locked during the tilting action and in this case the tilting action is obtained by a partial rotation of wheels 10 on the floor rather than through a rotation of the axle 9 within the wheels 10 or the axle brackets 11 with respect to the axle 9.

It will be seen that a relatively simple but effective device has been provided to facilitate the repair of electronic devices and particularly electronic devices such as console television sets where access to the set components is obtained through openings such as the regular heat openings in the set bottoms.

The relatively simple and portable device thus permits repairs to be made directly at the viewing position for such devices and particularly for relatively heavy electronic devices such as color television sets where such in-place repairs are particularly advantageous due both to the relatively great weight of the sets and due to the advantages of minimizing the moving of the sets both before and after the repair.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A repair fixture for cabinet mounted television sets including relatively heavy and fragile picture tubes mounted above additional electrical components and having access apertures in their bottoms to said additional components comprising a first normally upstanding support handle adapted to position and support the cabinet, a pair of support arms extending horizontally outwardly from the lower portion of said handle and including adjustably spaced end portions for supporting the cabinet outwardly of the access aperture, rollers positioned adjacent to the juncture of said handle and said arms for facilitating the tilting of the cabinet from an upright position on said support arms to a tilted position on the handle with the cabinet access aperture moved to an outwardly facing accessible position, means for adjusting the level of said rollers with respect to said handle comprising slotted brackets and cooperating threaded locking members, cushion means on said handle and said arms for yieldably engaging the cabinet, means on said handle for holding said handle horizontal when the fixture is in the tilted position, and the axis of said rollers being positioned outwardly from the plane of the side of the cabinet engaged by said handle.

References Cited

UNITED STATES PATENTS

| | | | |
|---|---|---|---|
| 1,921,661 | 8/1933 | Conner | 280—47.29 |
| 2,827,190 | 3/1958 | Spitzmesser | 280—47.24 |

FOREIGN PATENTS

| | | |
|---|---|---|
| 1,008,244 | 5/1952 | France. |

ROBERT C. RIORDON, Primary Examiner

D. D. EVENSON, Assistant Examiner

U.S. Cl. X.R.

280—47.24